United States Patent Office 3,429,851
Patented Feb. 25, 1969

3,429,851
SILICATE RESINS
Harold Coates, Wombourn, David Albert Brown, Longhope, and Francis Michael Peters, Birmingham, England, assignors to Electric Reduction Company of Canada Ltd., Islington, Ontario, Canada, a Canadian company
No Drawing. Continuation-in-part of application Ser. No. 466,461, June 23, 1965. This application Nov. 21, 1966, Ser. No. 595,469
Claims priority, application Great Britain, July 7, 1964, 28,021/64
U.S. Cl. 260—46.5                      8 Claims
Int. Cl. C08g 31/04; B32b 17/00

ABSTRACT OF THE DISCLOSURE

A silicon containing formaldehyde-resin precondensate useful for producing thermoset laminates. The precondensate is the reaction product of formaldehyde and precursors thereof, upon the products of the partial transesterification of a organic silicate tetraester with at least one polyhydroxy compound. The molar ratio of OH groups provided by said polyhydroxy compound per molar proportion of said silicate tetraester is between 7.2:1 and 8.4:1.

---

The present invention relates to improvements in the production of silicate/phenol resins and is a continuation-in-part of our copending application Ser. No. 466,461, now abandoned.

In our copending application we have described a composition for use in the production of heat-resistant laminates, mouldings or coatings which composition comprises in admixture a precondensate and formaldehyde or a precursor thereof. The precondensate is obtained by the partial transesterification of an organic silicate ester, such as tetra-ethyl or tetraphenyl silicate, with at least one polyhydroxy compound, such as Bisphenol A. In order to obtain laminates, mouldings or coatings, this precondensate is mixed with formaldehyde, or a precursor thereof such as hexamine, and the mixture applied to a substrate. The mixture is then cured under the influence of heat in the presence of a base to form formaldehyde modified materials. The process described is a two stage process which comprises preparation of the precondensate and subsequent addition of the formaldehyde, or precursor thereof, to it.

We have now found that the laminating, moulding or coating compositions may be prepared in a single stage by carrying out the partial transesterification in the presence of formaldehyde or a precursor thereof and a base to produce formaldehyde-modified precondensates which can then be further cured.

Accordingly, the invention provides formaldehyde-modified resin precondensates which have been obtained by the action of a compound selected from formaldehyde and precursors thereof upon the products of the partial transesterification of an organic silicate ester with at least one polyhydroxy compound.

From yet a further aspect, the invention provides a method for producing a heat-resistant material wherein a mixture, comprising a precondensate which has been obtained by the action of a compound selected from formaldehyde and precursors thereof upon the products of the partial transesterification of an organic silicate ester with at least one polyhydroxy compound, is cured by heating it to between 50 and 300° C. in the presence of a base and a curing agent selected from free formaldehyde or precursors thereof.

The silicate esters for use in the preparation of the precondensates may be tetra-alkyl, tetra-aryl, tetra-alkaryl or a mixed alkyl/aryl orthosilicate esters or partial hydrolysates thereof, and it is preferred to use esters derived from alcohols such as methanol, ethanol, propanol, butanol, 2-chloro-ethanol and benzyl alcohol; or from phenols, such as phenol itself, the cresols, xylenols; and derivatives of such alcohols or phenols which contain substituents which are themselves preferably hydroxyl non-reactive, thus reducing the loss of reactant polyhydroxy compound used in the transesterification reaction due to by-product formation. The preferred silicate esters for present use are tetra-ethyl silicate and tetra-phenyl silicate. There is usually no advantage in employing the silicate esters of more complicated structure since most, if not all, of the ester moiety therein finds no place in the finally cured fully polymerized product and that which remains in the precondensate is substantially completely displaced upon curing.

Preferably the polyhydroxy compounds, or mixtures thereof, for present use have an average hydroxyl functionality of 2. However, compounds of higher functionality, such as 3 or 4, may be used to increase the extent of cross-linking in the final product, though in admixture with a dihydroxy compound. Minor proportions of monohydroxy compounds, other than that displaced from the silicate ester, or water may be used to act as modifiers for the precondensate and to act as chain-stoppers during the curing of the precondensate, in order to control the flexibility and degree of cross-linking of the precondensate, thereby increasing the strength of the final cured product. Suitable monohydroxy compounds include phenols such as phenol itself, the cresols and xylenols.

We have found that the addition of $\alpha$-naphthol or $\beta$-naphthol to the polyhydroxy reactant in an amount of up to 25% by weight thereof results in resins which have improved heat ageing and flow characteristics. Where resins prepared from polyhydroxy compounds and $\alpha$- or $\beta$-naphthol are used in moulding compositions, the use of a mould release agent may be dispensed with.

The dihydroxy reactant employed may be a glycol, such as ethylene glycol, propylene glycol or a polyoxyalkylene glycol such as diethylene glycol or neopentyl glycol. However, it is preferred to use a dihydric phenol such as hydroquinone, catechol or resorcinol or, more preferably, diphenylol-propane (Bisphenol-A), 4,4'-dihydroxy diphenyl sulphone, 4,4'-dihydroxy diphenyl ether, 4,4'-dihydroxy diphenyl sulphide, 4,4'-dihydroxy-diphenyl, dicresylolpropane (Bisphenol-C) or dicyclohexanol-propane (Bisphenol-G).

If it is desired that the polyhydroxy reactant should comprise, at least in part, compounds having a hydroxyl functionality greater than 2, there may be employed for example glycerol, trimethylolpropane or pentaerythritol, though trihydric phenols, particularly phloroglucinol, are preferred for the purpose. The polyhydric compound may also contain inert substituents, particularly chlorine and/or fluorine atoms in the case of phenols, which provide an increased thermal stability in the resulting precondensate. Examples of substituted phenols which may be used include tetra-chloro- or tetra-fluoro-hydroquinone.

We have also found that the heat-ageing properties of laminates, coatings or mouldings, may be improved if the polyhydric compound employed contains a major proportion of one or more bis(4-hydroxycumyl) phenols.

The bis(4-hydroxycumyl) phenols may be used in admixture with up to 90% by weight of the mixture of other polyhydric compounds. However, it is usually preferred to use the bis(4-hydroxycumyl) phenols as the sole polyhydric reactant. The bis(4-hydroxycumyl) phenols are compounds having the general formula

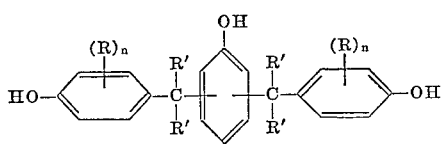

wherein each R group is hydrogen, halogen alkyl or alkoxy, each R' is hydrogen, lower alkyl or cyclo-alkyl and may be the same or different, n has a value of 1 or 2 and when n is 2 at least one ortho position to the OH group in each aromatic ring is unsubstituted, and may be prepared by any of the conventional methods. It is not necessary to separate the various isomeric forms of the bis (4-hydroxycumyl) phenols from each other. We have found that the mixture of isomers wherein R is hydrogen and R' is methyl, prepared by fission of Bisphenol A in the presence of sodium hydroxide under the influence of heat and having a boiling point of from 200 to 210° C. at 20 mm. Hg, provide a suitable reactant for present use.

In preparing the precondensate, the silicate esters and polyhydroxy compound may be employed in a wide range of molecular proportions, depending on the use to which the precondensate product is to be put. Thus, variation in the molecular ratio of silicate ester and polyhydroxy compound employed has an effect on the ease with which the precondensate may be cured. However, we have found that with tetra-ethyl silicate ester or tetraphenyl silicate ester and Bisphenol-A or hydroquinone satisfactory products are obtained using a molar ratio of polyhydroxy compound to silicate ester to provide a ratio of hydroxy groups per mol of silicate ester of from 7.2:1 to 8.4:1, preferably from 7.6:1 to 8.0:1.

Where precondensates which are not formaldehyde-modified are desired, the transesterification reaction may be carried out merely by mixing the silicate ester and polyhydroxy reactants in the appropriate quantities and subjecting the mixture to heat for a time sufficient for the desired amount of the monohydroxy compound (which is less than the theoretical amount) to be displaced. The transesterification reaction may readily be followed by measuring the amount of monohydroxy compound displaced from the silicate ester. The extent to which polymerisation is carried out depends on the use to which the final resin is to be put and the nature of the reactants. However, we find that polymerisation should be carried out at least until 50% of the theoretical amount of monohydroxy compound is displaced and that once 95% of the theoretical amount has been displaced the reaction mixture becomes viscous and begins to gel. Normally the reaction is carried out until 80-90% of the theoretical quantity of monohydroxy compound has been displaced.

The reaction is preferably carried out under substantially neutral conditions. Esterification catalysts may be used if desired. Suitable catalysts include for example phenate salts, particularly alkali-metal phenates such as the sodium or potassium salts of phenol or cresol. Salts which form such phenate salts in situ by reaction with the reagent polyhydric phenols or with the monohydric phenols displaced from aryl silicate esters may also be employed. Examples of such salts include alkali-metal hydroxides, carbonates or alkoxides. The alkali-metals themselves may also be used. Other suitable catalysts include barium, magnesium, or aluminum alkoxides, organotin compounds, Friedel Craft catalysts such as ferric chloride and aluminium chloride, titanate esters such as tetraisopropyl titanate, and lead carbonate. The amount of catalyst employed is for example from 0.01 to 0.2 mol per molecular proportion of the total polyhydroxy compound employed.

The transesterification reaction is carried out under the influence of heat. The reaction temperature is preferably chosen to be such as to enbale the monohydroxy compound, which is produced during the transesterification reaction, to be distilled off from the reaction mixture during the course of the reaction. The temperature chosen will depend on the ester moiety of the silicate ester and varies between 50 and 350° C., usually from 180° C. to 240° C. The temperature should always be sufficiently great to maintain the reaction medium in the molten state. Although the temperature chosen may permit the monohydroxy compound to be evolved with ease in most cases, it may be preferred to carry out the reaction under reduced pressure to assist its removal from the reaction mixture. Where bis(4-hydroxycumyl) phenols are employed it may be desired to employ slightly higher reaction temperatures, usually about 260° C., in order to ensure an adequate rate of reaction.

The reaction may be conveniently carried out by merely mixing the reactants in the absence of any solvent of diluent medium. To minimise the risk of hydrolysis of the silicate esters and the resin product, the reactants are preferably anhydrous. If desired, inert diluents or solvents may be used.

Where formaldehyde-modified precondensates are desired, the partial transesterification described above is carried out in the presence of formaldehyde, or a precursor thereof, and a base. The silicate ester and polyhydroxy compounds employed as reactants are the same as those described above and they may be used in the same proportions. The base required during the reaction is preferably ammonia, though other bases such as sodium hydroxide or organic amines may be employed. The base may either be used as such, or formed in situ, as for example when hexamethylenetetramine is used as the formaldehyde precursor. Suitable formaldehyde precursors include hexamine and salts thereof, hexamine hydroperoxide and methylene diacetate. The amount of formaldehyde or a precursor thereof is usually equivalent to from 2-50% preferably 15%, by weight of formaldehyde based upon the total weight of silicate ester and polyhydroxy compound employed. Where hexamethylenetetramine is used as the formaldehyde precursor, this provides the base and formaldehyde required and may also be used in the form of its salts with such acids as acetic acid, benzoic acid and formic acid.

The desired amounts of silicate ester, polyhydroxy compound, formaldehyde or a precursor thereof, and base are mixed together at the same time and allowed to react to yield a partially cured formaldehyde-modified precondensate which may subsequently be fully cured during the preparation of the laminate, moulding or coating. If desired, the formaldehyde, or precursor thereof, may be added dropwise over a period of time, or alternatively, a portion of the desired amount may be retained and added at some subsequent stage to the formaldehyde-modified precondensate formed during the reaction to provide the necessary formaldehyde to complete the curing of the precondensate.

The reaction in the presence of formaldehyde or a precursor thereof and a base may conveniently be carried out by merely mixing the reactants in a conventional mixer such as a Z-arm mixer and subjecting the mixture to heat for a time sufficient to achieve the desired extent of reaction. The reaction temperature is usually between 100° C. and 250° C. and is preferably 110° to 130° C. In view of the fact that formaldehyde, or a precursor thereof, and a base are present in the reaction mixture any phenols displaced from the silicate ester employed may react therewith to yield phenol-formaldehyde resins. However, where the monohydric alcohol which is displaced from the silicate ester does not react it may be preferred to carry out the reaction under reduced pressure to assist in the removal of the displaced alcohol from the reaction mixture.

It is not usually necessary to employ solvent or diluent media in carrying out the reaction. However, where this is desired high boiling solvents such as xylene or e-dichlorobenzene may be used. Alternatively, the precondensate may be diluted with a minor proportion, e.g., by 10% weight, of a diluent such as methanol, ethanol, isopropanol or methyl etheyl ketone. The reactants and any solvents used should be substantially anhydrous, to minimise the risk of hydrolysis.

The reaction is usually carried out until either the reaction mixture begins to gel, that is when it becomes too viscous for easy handling, or, where a solvent is used, the reaction mixture begins to precipitate out from the solvent. The reaction may then be terminated by cooling the mixture and, if necessary, separating it from the solvent used.

All reaction products are usually in the form of a brittle mass which requires preliminary crushing and are capable of further polymerisation. For ease of handling, it is preferred to dissolve the materials in a solvent since it is in this form that they will generally be used in preparing the laminating, moulding or coating compositions of the invention. Suitable solvents for present use include lower alcohols or ketones such as methanol, ethanol, isopropyl alcohol or methyl ethyl ketone. Although the formaldehyde-modified precondensates are stable over prolonged periods, the nonmodified precondensates undergo polymerisation which may adversly affect the strength of articles prepared therefrom. This polymerisation may be inhibited by the addition of minor amounts of acids, such as benzoic acid or p-toluene sulphonic acid, to the precondensate so that the pH value of the precondensate lies between about 5 and 6.5. Alternatively, the precondensate may be partially cured and the partially cured precondensate used to prepare the laminating, moulding or coating agent as above. The partial cure is achieved by the addition of that amount of a curing agent, which is formaldehyde or a precursor thereof, and a base, required to effect complete curing to the precondensate and warming the mixture. The warming is carried out at from 110 to 150° C. preferably at from 120 to 130° C. and may with advantage be carried out in a Z-arm mixer such as a Morton mixer. In preparing the partially precured precondensate, the precondensate may first be dissolved in an inert solvent such as xylene, toluene or isoamyl acetate and the mixture with the curing agent warmed until the curing agent just dissolves or the precondensate begins to come out of solution. Where no solvent is used, the precondensate is melted and the curing agent added thereto. Heating is continued until the mixture either begins to foam, when hexamethylenetetramine is used, or becomes too viscous for ease of handling. In all cases the curing reaction is terminated, before complete curing has occurred by cooling the reaction mixture.

The compositions of the invention comprise a precondensate (which may have been partially cured as described above) or a formaldehyde-modified precondensate mixed with sufficient free formaldehyde or a precursor thereof, to bring about the complete curing of the precondensate. The presence of a base is also essential to achieve curing of the composition but, as indicated below, the base need not be admixed with the composition until it is desired to carry out the curing. As indicated above sufficient formaldehyde or a precursor thereof, and base to effect the complete cure are usually present in the formaldehyde-modified precondensate. However, where this is not the case the additional amount required may be added before the final cure is carried out. Where the precondensate has not been partially cured and is not formaldehyde-modified, it is admixed with the required amounts of base and formaldehyde or a precursor thereof. As with the preparation of the formaldehyde-modified precondensates it is preferred to derive both the formaldehyde and the base from hexamethylenetetramine or salts thereof, though the other bases and precursors referred to above may also be employed. The amount curing agent employed will vary with the nature of the precondensate, the extent to which it is already cured and the use to which the cured material is to be put. The amount will usually be the equivalent of from 2 to 50% by weight of formaldehyde, based on the total weight of silicate ester and polyhydroxy compound employed.

The laminating, moulding or coating compositions may be prepared merely by mixing the ingredients togther. As indicated earlier it is preferred to prepare the compositions in liquid form and therefore to dissolve the ingredients in a solvent or diluent medium such as lower alcohols or ketones. The compositions may also contain other conventional ingredients such as pigments and fillers. Since the precondensates may undergo some curing in the presence of the formaldehyde or a precursor thereof and a base, it is preferred to admix the ingredients of the compositions of the invention shortly before use. Where the compositions of the invention are used upon a continuous basis, for example in the continuous production of laminates asbestos boarding, it may be preferred to add the separate ingredients continually to a bath through which the substrate to which the composition is to be applied is passing.

As indicated above, the amounts of formaldehyde or precursor thereof and base which have ben added to the reaction mixture are usually those required to obtain complete curing of the formaldehyde-modified precondensate. However, where this is not the case, the additional amounts required should be added tothe formaldehyde-modified precondensate before the final cure is carried out.

The substrate for present use may be in fibrous or woven form and may suitably be asbestos, metal, wood, paper, glass, silica carbon, or other heat-resistant fibrous or porous material. The use of glass cloth which has undergone a surface treatment such as heat cleaning or treatment with an amino-silane primer is especially preferred. The method of applying the laminating or moulding agent to the substrate may be any of those commonly employed, for example by padding or impregnating the substrate in a bath of the laminating or moulding agent, or mixing the precondensate and the substrate together in a Z-arm or other similar mixer. The precondensates may also be applied by other methods, such as a hot dipping technique, if desired. The impregnated substrate is then subjected to a treatment which cures the laminating or moulding agent to give a rigid product. The curing is effected by heating the laminate or moulding to such a temperature, and for such time as to effect the curing of the precondensate in the presence of the free formaldehyde or a precursor thereof and the base. Preferably pressure is also applied to the laminate or moulding during curing and may be as much as 3 tons per square inch. The time and temperature of curing vary over broad limits with the nature of and the amount of the precondensate present in the laminating or moulding agent, but the latter will usually lie between 80 and 300° C., for example from 175–200° C. for from five to sixty minutes. Where solvent or diluent media have been used in the preparation of partially cured or formaldehyde-modified precondensates, it is preferred to dry the compositions of the invention, which may have already been applied to the substrate, by heating at from 100° to 150° C. prior to curing.

The laminate moulding or coating may also be given a further heat treatment after removal from the press i.e. a post-stoving operation. By this means the cross-break strength of the laminates or mouldings may often be further improved. We have found that a suitable post-stoving cycle is:

| | |
|---|---|
| 8 hours at 75° C. | 16 hours at 200° C. |
| 16 hours at 100° C. | 8 hours at 225° C. |
| 8 hours at 125° C. | 16 hours at 250° C. |
| 16 hours at 150° C. | 8 hours at 275° C. |
| 8 hours at 175° C. | |

This cycle may be altered to suit each type of laminate formulation, for example the cycle may start at 100° C. with increments of 20° C. carried out over similar time periods.

The invention will now be illustrated by the following examples in which all parts are by weight:

Example 1

Diphenylol-propane (456 grams; 2.0 moles) were mixed with tetraethyl silicate (104 grams; 0.5 mole) and the mixture was heated in a resin flask in an oil bath to an internal temperature of 200° C. Ethanol was evolved after the temperature had reached 160° C. and a total of 87.5 grams (93.5% of the theoretical) was evolved during the course of the reaction. The product was a pale brown viscous liquid which set on cooling to a hard brittle transparent solid.

Laminates were prepared from the resin by impregnating glass cloth with a solution of 50 gms. of the resin in 100 ml. of alcohol and containing 5 gms. hexamethylene tetramine. The laminates were dried at 150° C. for 20 mins. and pressed at 230° C. under a pressure of 1 ton per square inch for 30 mins.

The laminates had an initial mean cross-break strength of 58,410 p.s.i. dropping to 43,790 p.s.i. after ageing for 65 hrs. at 270° C. Laminates prepared similarly from asbestos cloth had an initial mean cross-break strength of 26,140 p.s.i. dropping to 11,105 p.s.i. after 65 hrs. at 270° C.

Example 2

Diphenylol-propane (456 grams; 2.0 moles) and tetraethyl silicate (104 grams; 0.5 mole) were mixed and heated as in Example 1 but the reaction was terminated when 85% of the theoretical quantity of ethanol had been evolved.

Laminates, prepared with glass cloth as in Example 1, dried for 30 mins. at 120° C. and pressed at 190° C. under a pressure of 1 ton p.s.i. showed an initial mean cross-break strength of 102,000 p.s.i. reducing to 65,000 after heating for 50 hrs. at 280° C.

Example 3

Diphenylol-propane (342 grams; 1.5 moles) and tetraethyl silicate (104 grams; 0.5 mole) were mixed and heated as in Example 1. The reaction was terminated when 70% of the theoretical quantity of ethanol had been evolved.

Laminates prepared with glass cloth from this resin as in Example 1 showed an initial mean cross-break strength of 35,000 p.s.i.

Example 4

Diphenylol-propane (242 grams; 1.0 mole) were mixed with tetraethyl silicate (104 grams; 0.5 mole) and heated as in Example 1. The reaction was terminated after 55% of the theoretical quantity of ethanol had been evolved.

Laminates from this resin with glass cloth as in Example 1 showed an initial cross-break strength of 22,830 p.s.i. reducing to 16,300 after heating for 100 hrs. at 270° C.

Example 5

Hydroquinone (220 grams; 2.0 moles) and tetraethyl silicate (104 grams; 0.5 mole) were mixed and heated to 220° C. as in Example 1. The reaction was terminated after the evolution of 76% of the theoretical quantity of ethanol.

Laminates prepared from this resin with glass cloth as in Example 1 showed a mean cross-break strength of 18,080 p.s.i. decreasing to 3000 p.s.i. after heating for 65 hours at 270° C.

Example 6

Resorcinol (220 grams; 2.0 moles) and tetraethyl silicate (104 grams; 0.5 mole) were mixed and heated to 220° C. as in Example 1. The reaction was terminated after the evolution of 85% of the theoretical quantity of ethanol.

Laminates prepared with glass cloth from this resin as in Example 1 showed an initial mean cross-break of 14,880 p.s.i., decreasing to 2000 p.s.i. after heating for 60 hrs. at 270° C.

Example 7

Diphenylol-propane (456 grams; 2.0 moles), tetraethyl silicate (104 grams; 0.5 mole) and phenol (2.3 grams) were mixed and heated as in Example 1. The reaction was terminated after the evolution of 90% of the theoretical quantity of ethanol.

Laminates prepared with glass cloth from this resin as in Example 1 showed an initial mean cross-break strength of 86,880 p.s.i. Their cross-break strength was improved to 91,000 p.s.i. after post-stoving to 230° C. for 2 hours.

Example 8

Diphenylol-propane (456 grams; 0.2 moles), tetraethyl silicate (104 grams; 0.5 mole) and sodium ethoxide (1.0 gram) were mixed and heated as in Example 1. Ethanol was evolved at 140° C. and the reaction was terminated when 90% of the theoretical quantity had been evolved.

Laminates prepared on glass cloth from this resin as in Example 1 showed an initial mean cross-break strength of 68,000 p.s.i.

Example 9

Diphenylol-propane (456 grams; 2.0 moles), tetraethyl silicate (104 grams; 0.5 mole) and tetraisopropyl titanate (0.5 gram) were mixed and heated as in Example 1. Ethanol was evolved at 140° C. and the reaction was terminated after the evolution of 90% of the theoretical.

Laminates prepared on glass cloth as in Example 1 from this resin showed an initial mean cross-break strength of 65,000 p.s.i.

Example 10

Hydroquinone (247 grams; 2.75 moles) tetraethyl silicate (104 grams; 0.5 mole) and phosphorus pentoxide (36 grams; 0.25 mole) were mixed and heated as in Example 1. The reaction was terminated after the evolution of 51% of the theoretical quantity of ethanol.

Laminates prepared on asbestos cloth as in Example 1 showed an initial mean cross-break strength of 12,600 p.s.i., reducing to 4500 p.s.i. after heating for 65 hours at 270° C.

Example 11

Diphenylol-propane (456 grams; 2.0 moles) and tetraphenyl silicate (200 grams; 0.5 mole) were mixed and heated as in Example 1 until 90% of the theoretical quantity of phenol had been collected. A vacuum was applied to remove all traces of free phenol. Laminates prepared on glass cloth as in Example 1 from this resin showed an initial mean cross-break strength of 83,000 p.s.i.

Example 12

Diphenylol-propane (456 grams; 2 moles), tetraethyl silicate (104 grams; 0.5 mole) and phenol (7.0 grams) were mixed and heated as in Example 1. The reaction was terminated after the evolution of 90% of the theoretical quantity of ethanol. Laminates prepared on glass cloth as in Example 1 from this resin showed an initial mean cross-break strength of 112,900 p.s.i.

Example 13

A precondensate was prepared as in Example 12, by reacting together diphenylol-propane and tetraphenyl silicate in a molar ratio of 4:1. The precondensate (1122 grams) was crushed and placed in a Z-arm mixer, where it was heated to a temperature of 120–125° C. Hexamethylene tetramine (250 grams) was added, and the mixture maintained at 120° C. for 30 minutes. The mixture slowly developed a deep yellow colour, became increasingly viscous and finally evolved ammonia and began to foam. The reaction was terminated when foaming commenced by cooling the reaction mixture to yield a hard yellow brittle foam which was soluble in methanol. The methanolic solution of the partially cured precondensate was impregnated onto a glass cloth and heated for 30 minutes under a pressure of 1 ton per square inch at 185° C.

The resulting laminate had a mean cross-break strength of 123,100 p.s.i. and showed excellent resistance to immersion in solvents, reagents and boiling water. The ageing properties of the laminate were tested and found to be: after 150 hours at 260° C. 85–90% of the strength was retained: after 250 hours at 260° C. more that 75% of the strength was retained.

Example 14

A precondensate was prepared by reacting diphenylolpropane, β-naphthol and tetraphenyl silicate in molar ratio of 3.75:0.25:1. This precondensate (1000 gms.) was crushed and placed in a Z-arm mixer and heated to 150° C. Hexamethylenetetramine (150 grams) was added and the mixture maintained at 150° C. A reddish colour developed, ammonia was evolved and the product became very viscous. The reaction was terminated by cooling when foaming commenced, to yield a reddish hard brittle foam. This was crushed, dissolved in methanol and used to laminate a glass cloth. The laminate possessed a mean cross-break strength of from 97,500 to 100,000 p.s.i. On ageing at 260° C. for 150 hours the laminate retain 85–90% of its original strength which decreased to 74–80% after heating for 250 hours.

Example 15

A precondensate was prepared by reacting diphenylolpropane and tetraphenyl silicate in a molar ratio of 4:1 using lead carbonate (0.1%) as catalyst. This precondensate (100 gms.) was reacted with hexamethylenetetramine as in Example 13 and the partially cured precondensate used to prepare a laminate, which possessed a mean cross-break strength of 110,000 p.s.i. On ageing at 260° C. for 150 hours the strength retention was 90% and after 250 hours was 75–80%.

Example 16

A precondensate was prepared by reacting diphenylolpropane and tetraphenyl silicate in a molar ratio of 4:1. This precondensate (200 gms.) was dissolved in xylene (250 mls. at 130–140° C. Hexamethylenetetramine (40 gms., 20% by weight based on the precondensate) was added and the mixture heated to 140° C. for 30 minutes, to yield a viscous yellow oil. This oil was poured out and allowed to cool. A solution of the oil (200 gms.) in methylated spirits (100 mls.) gave a yellow viscous solution which was used to produce a laminate having a mean cross-break strength of 103,000 p.s.i.

If the oil prior to dissolution in methylated spirits, was allowed to stand for 48 hours to allow the xylene to evaporate slowly, the cross-break strength of a laminate produced therefrom was 111,000 p.s.i.

Example 17

A precondensate was prepared by reacting diphenylolpropane with tetraphenyl silicate in various molar ratios. The resulting precondensates were used to prepare laminates and the results are set out below:

| Molar ratio of diphenylol propane to silicate ester | Percent phenol displaced | Cross-break strength of laminate (p.s.i.) |
|---|---|---|
| 4.2:1 | 90 | 80–94,000 |
| 4.1:1 | 90 | 80–92,000 |
| 3.8:1 | 75 | 88–100,000 |
| 3.6:1 | 68 | 63–80,000 |

Example 18

A precondensate was prepared as in Example 14 and 100 parts of this were dissolved in methyl ethyl ketone (400 parts). This solution was applied to clean iron and copper wires or sheet by dipping or spraying. The coated pieces were then dried at 100° C. for 10 minutes and cured by heating at 200° C. for 30 minutes.

The lacquers thus obtained showed good flexibility and adhesion to the surfaces and retained these properties to a substantial extent after heat ageing for 100 hours at 265° C.

Example 19

A mixture of bis(4-hydroxycumyl) phenols was prepared by thermally decomposing Bisphenol A in the presence of sodium hydroxide. The fraction of the mixture having a boiling point of 200 to 210° C. at 20 mm. of mercury was used at the reactant herein.

The reactant mixture of bis(4-hydroxycumyl) phenols (360 parts) was mixed with tetraphenyl silicate (100 parts). The mixture was stirred during mixing and heated to 260° C. The reaction mixture was held at this temperature whilst phenol (90 parts) was removed by distillation and then allowed to cool to give a brown resin.

The resin product was broken up and 300 parts were dissolved in methanol (200 parts). Hexamethylenetetramine (40 parts) was added to provide the necessary formaldehyde and base to achieve curing of the resin. Glass fibre cloth, which had undergone a surface heat cleaning, was impregnated with the resin solution and laminates were prepared from the impregnated cloth by heating at a temperature of 185° C. under a pressure of 2 tons per square inch.

The laminates possessed an initial cross-break strength of 72,650 p.s.i. Upon ageing at 265° C. the following strengths were noted.

| Time (hours) | Strength (p.s.i.) | Percent retention of strength |
|---|---|---|
| 113 | 61,000 | 84 |
| 225 | 56,500 | 78 |
| 454 | 56,500 | 78 |
| 622 | 52,700 | 72.5 |
| 1006 | 45,200 | 62 |
| 1328 | 25,500 | 35 |

Comparative Example

By way of comparison, a resin was prepared as above using Bisphenol A (228 parts), tetraphenyl silicate (100 parts). This resin (100 parts) was dissolved in methylated spirits (100 parts) and hexamethylenetetramine (15 parts) added. Laminates of this composition on heat cleaned glass cloth possessed an initial mean cross-break strength of 78,800 p.s.i.

Upon heat ageing at 265° C. the following strengths were observed:

| Time (hours) | Strength (p.s.i.) | Percent retention of strength |
|---|---|---|
| 0 | 78,800 | |
| 64 | 64,000 | 81.2 |
| 154 | 58,500 | 74.2 |
| 386 | 54,500 | 69.2 |
| 730 | 42,500 | 53.9 |
| 985 | 21,300 | 27.0 |

Although the initial strength of this laminate was greater than that prepared according to the invention, the heat ageing properties were markedly poorer.

Example 20

Mixed bis(4-hydroxycumyl) phenols (271.5 parts) and tetraphenyl silicate (100 parts) were reacted as in Example 19. The resin product (100 parts) was dissolved in methylated alcohol (100 parts) and hexamethylene tetramine (15 parts) was added. Laminates prepared as in Example 19 showed a mean cross-break strength of 59,000 p.s.i. Where the glass fibre substrate had been given a surface treatment with an amino-silane, the initial strength was 81,000 p.s.i.

Example 21

Mixed bis(4-hydroxycumyl) phenols (181 parts) and tetraphenyl silicate (100 parts) were reacted as in Example 19, the reaction being terminated after 55 parts of phenol had been evolved, to yield a yellow semi-viscous liquid. This liquid (100 parts) and hexamethylene-tetramine (15 parts) were dissolved in methylated alcohol (100 parts) and laminates prepared therefrom as in Example 19 showed a mean cross-break strength of 72,000 p.s.i.

Example 22

Mixed bis(4-hydroxycumyl) phenols, (241 parts) were reacted with tetraphenyl silicate (100 parts) as in Example 19 and laminates prepared as in Example 19 from the resin product (100 parts) and hexamethylene-tetramine (15 parts) dissolved in methylated spirits (100 parts) possessed mean cross-break strengths of 75,000 p.s.i., where the glass fibre substrate had been heat-cleaned, and 90,500 p.s.i. when the glass fibre substrate had been given a commercial heat stable surface treatment.

Example 23

Bisphenol-A (912 parts), tetraphenyl silicate (400 parts) and hexamethylene tetramine (265 parts) were mixed in a Z-arm Morton mixer. The mixture was heated to 150° C. when the mass melted. After 30 minutes at that temperature the liquid turned yellow, and began to thicken. It rapidly became more viscous and began to evolve ammonia after 50–60 minutes. It eventually foamed after 90 minutes. The liquid was poured out as a deep yellow transparent viscous fluid, but set on cooling to a hard brittle solid. The precondensate was readily soluble in methanol giving a clear yellow solution. Lamination on glass cloth gave excellent results; cross-break strengths in the region of 100,000–106,000 p.s.i. being obtained.

Example 24

Hydroquinone (440 parts), tetraphenyl silicate (400 parts) and hexamine (170 parts) were mixed as in Example 23. A reddish colour developed on heating to 150° C. After 45 minutes at this temperature, the mass became a deep red colour, highly viscous and began to foam. On pouring out of the mixer and cooling the product was a deep red, hard, brittle solid, readily soluble in methanol. Lamination on glass cloth produced a mean cross-break strength of 70,750 p.s.i.

Example 25

The process of Example 24 was repeated, but heating was carried out at 120° C. for 4 hours and produced a similar deep red viscous fluid which again set to a hard brittle solid. Lamination on glass produced excellent laminates of cross-break strengths up to 80,550 p.s.i.

Example 26

Hydroquinone (220 parts) Bisphenol-A (456 parts), tetraphenyl silicate (400 parts) and hexamine (210 parts) were mixed as in Example 23. Heating at 130° C. for 2 hours produced a highly viscous brownish fluid. On cooling, this set to a hard, brittle toffee-coloured mass, readily soluble in methanol. Lamination on glass produced a mean cross-break strength of 85,450 p.s.i.

Example 27

Bisphenol-A (684 parts), α-naphthol (144 parts), tetraphenyl silicate (400 parts) and hexamine (246 parts) were mixed in a Morton mixer as in Example 23. After 1½ hours at 130° C. the mixture developed a yellow colouration, became much more viscous and evolved ammonia. The product was poured out and allowed to cool, when it set to a hard brittle yellow solid. Solution in methanol gave a deep green clear solution. Impregnation on glass cloth followed by lamination produced excellent laminates with a mean cross-break strength of 98,500 p.s.i.

Example 28

Hydroquinone (220 parts) tetraphenyl silicate (400 parts) and hexamine (125 parts) were heated as in Example 26. The product was again a deep reddish-brown viscous fluid, but limination on glass cloth gave inferior results, cross-break strengths of only 38,000 p.s.i. being obtained.

Example 29

Bisphenol-A (798 parts), α-naphthol (72 parts), tetraphenyl silicate (400 parts) and hexamine (254 parts) were mixed and heated as in Example 27. After 1½ hours the mass began to foam. It was removed from the mixer, and cooled. It set to a crisp, brittle foam with a "honeycomb" appearance. The foam was readily soluble in methanol to give a deep bluish-green solution. Lamination on glass cloth showed extremely good results, cross-break strengths up to 110,000 p.s.i. being obtained.

Example 30

Bisphenol-A (798 parts), α-naphthol (72 parts), tetraethyl silicate (208 parts) and hexamine (162 parts) were heated in a Morton mixer at 150° C. for 1½ hours. The mass steadily turned greenish yellow and became more viscous. Ammonia was evolved and the product began to foam. On pouring out it set to a hard, brittle, deep green solid. Solution in methanol and lamination on glass cloth produced laminates of mean cross-break strength 87,000 p.s.i. These showed a retention in strength of 79–81% after a suitable post-stoving period and ageing for 150 hours at 260° C. The retention fell to 68–70% after a total of 260 hours at 260° C.

Example 31

Bisphenol-A (798 parts), α-naphthol (72 parts), tetraphenyl silicate (400 parts) and hexamine (190 parts) were heated as in Example 30. Lamination of the product on glass cloth showed cross-break strengths of 78,000–95,000 p.s.i. These laminates showed a retention of 75–85% of their strength after ageing for 260 hours at 260° C.

Example 32

Bisphenol-A (912 parts), tetraphenyl silicate (400 parts) and hexamine (262 parts) were mixed and heated as in Example 23. The heating was continued until the mass foamed. On cooling, it set to a crisp, brittle "honeycomb" like foam, readily soluble in methanol. Lamination of the product on glass cloth produced cross-break strengths of 100,000–107,000 p.s.i. These strengths reduced to 85–90% after 100 hours at 265° C. and to 78–80% after 225 hours at 265° C.

Example 33

Bisphenol-A (798 parts), β-naphthol (72 parts), tetraphenyl silicate (400 parts) and hexamine (190 parts) were heated together as in Example 30. The product was a yellowish-green foam, soluble in methanol to give a reddish solution. Lamination on glass cloth produced cross-break strengths of 80,000–100,000 p.s.i. Excellent retention in strength was obtained after ageing at 265° C. after a suitable stoving cycle, e.g. 90% after 150 hours; 84% after 425 hours and 80% after 600 hours at 265° C.

We claim:

1. Formaldehyde-modified resin precondensates which have been obtained by the action at a temperature between 100° C. and 250° C. of a compound selected from formaldehyde and precursors thereof upon the products of the partial transesterification carried out at a temperature between about 50° C. and 350° C. of an organic silicate tetraester having the formula $(RO)_4Si$ wherein R is at least one group selected from the group consisting of alkyl, aryl, and alkaryl, or partial hydrolysate thereof, with at least one polyhydroxy compound selected from the groups consisting of polyhydroxy alcohols and polyhydroxy phenols, the molar ratio of OH provided by said polyhydroxy compound per molar proportion of said silicate tetraester being between 7.2:1 and 8.4:1.

2. A precondensate as claimed in claim 1 wherein the said partial transesterification has been carried out in the presence of hexamethylenetetramine as a formaldehyde precursor.

3. A precondensate as claimed in claim 1 which has been obtained from polyhydroxy compounds having an average hydroxyl functionality greater than 2 and not more than 4.

4. A precondensate as claimed in claim 1 wherein the polyhydroxy compounds contain bis(4-hydroxy-cumyl) phenols.

5. A method for producing a heat-resistant material wherein a mixture consisting essentially of a precondensate which has been obtained by the action at a temperature between about 100° C. and 250° C. of a compound selected from formaldehyde and precursors thereof upon the products of the partial transesterification carried out at a temperature between about 50° C. and 350° C. of an organic silicate tetraester having the formula $(RO)_4Si$ wherein R is at least one group selected from the group consisting of alkyl, aryl, and alkaryl, or partial hydrolysate thereof, with at least one polyhydroxy compound selected from the group consisting of polyhydroxy alcohols and polyhydroxy phenols, is cured by heating it to between 50° C. and 300° C. in the presence of a curing agent selected from free formaldehyde or precursors thereof; the molar ratio of OH provided by said polyhydroxy compound per molar proportion of said silicate tetraester being between 7.2:1 and 8.4:1.

6. A method as claimed in claim 5 wherein the formaldehyde required during curing are provided by the use of hexamethylenetetramine as a formaldehyde precursor.

7. A method as claimed in claim 5 wherein the curing is carried out in contact with a substrate.

8. The process of claim 5 wherein partial transesterification of said tetraester with the polyhydroxy compound, is carried out under substantially anhydrous conditions.

References Cited

UNITED STATES PATENTS

| 2,755,269 | 7/1956 | Moorhead | 260—46.5 |
| 3,192,241 | 6/1965 | Roebuck | 260—46.5 |

FOREIGN PATENTS

| 857,153 | 12/1960 | Great Britain. |
| 535,527 | 1/1957 | Canada. |
| 560,697 | 7/1958 | Canada. |

DONALD E. CZAJA, *Primary Examiner.*

M. I. MARQUIS, *Assistant Examiner.*

U.S. Cl. X.R.

156—329; 117—161, 126; 161—93, 193, 198; 260—448.8, 826